3,247,440
CHARGING CIRCUIT
David F. Brower, San Diego (La Jolla), and Richard A. Conrad, San Marcos, Calif., assignors to General Dynamics Corporation, New York, N.Y., a corporation of Delaware
Continuation of application Ser. No. 170,062, Jan. 31, 1962. This application Mar. 17, 1965, Ser. No. 443,767
5 Claims. (Cl. 320—1)

This is a continuation of application Serial No. 170,062 filed on January 31, 1962 and now abandoned.

This invention relates to control circuits and more particularly to a circuit which can be utilized to effect and accurately control the production of high amperage pulses of direct current.

Various advanced experimental and production techniques call for the utilization of extremely high amperage pulses of direct current. For example, a feasible method utilizing high amperage current pulses to produce intense magnetic fields has been developed so that the forming of various shapes and configurations of work pieces can be accomplished. This method is disclosed and claimed in United States Patent No. 2,976,907 which issued on March 28, 1961. In such a method, a high amperage current pulse is passed through a coil by discharging a charged capacitor bank through the coil.

Prior circuits capable of selectively charging and discharging a capacitor bank to produce the high amperage pulses of direct current have not been completely adequate, inasmuch as such circuits cannot automatically effect and control this charging and discharging. Moreover, the circuits used in the past could not be selectively adjusted to accommodate desired variations in the magnitude of current pulses produced thereby.

Accordingly, it is a prime object of the present invention to provide a control circuit which can be utilized to effect the production and control the magnitude of high amperage current pulses which can be utilized in magnetic forming or other operations wherein such current pulses are required.

Another object of the present invention resides in the provision of a control circuit which is capable of being adjusted to accommodate desired variations in the instantaneous production and magnitude of the desired high amperage current pulses.

A further object of the invention resides in the provision of a control circuit wherein adjustable nulling circuitry is utilized to efficiently control the magnitude of high amperage current pulses which can be utilized in magnetic forming or other operations.

Still another object of the invention resides in the provision of a control circuit which is efficient and reliable and which can be constructed at reasonable cost.

Figure 1:
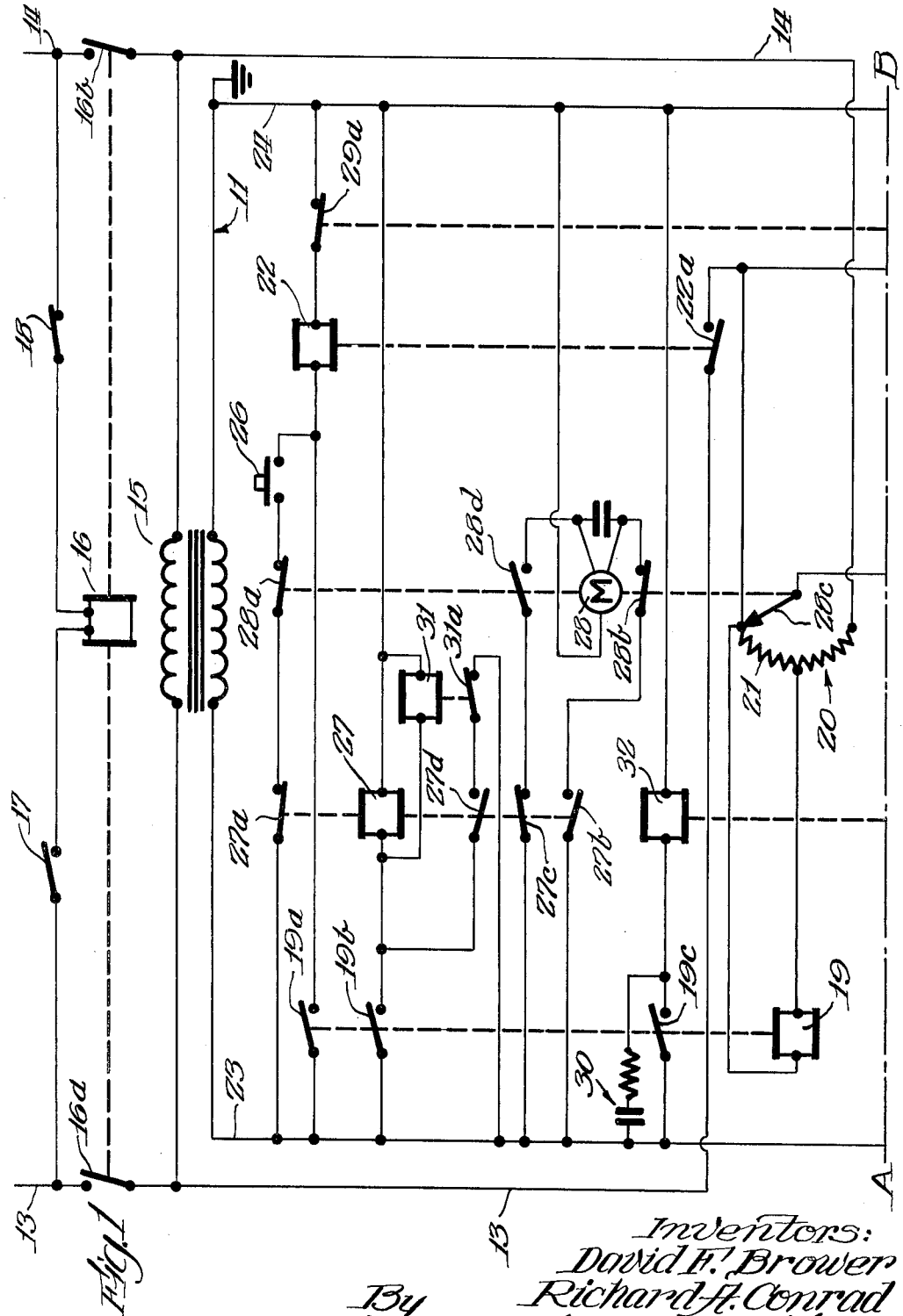
Figure 2:
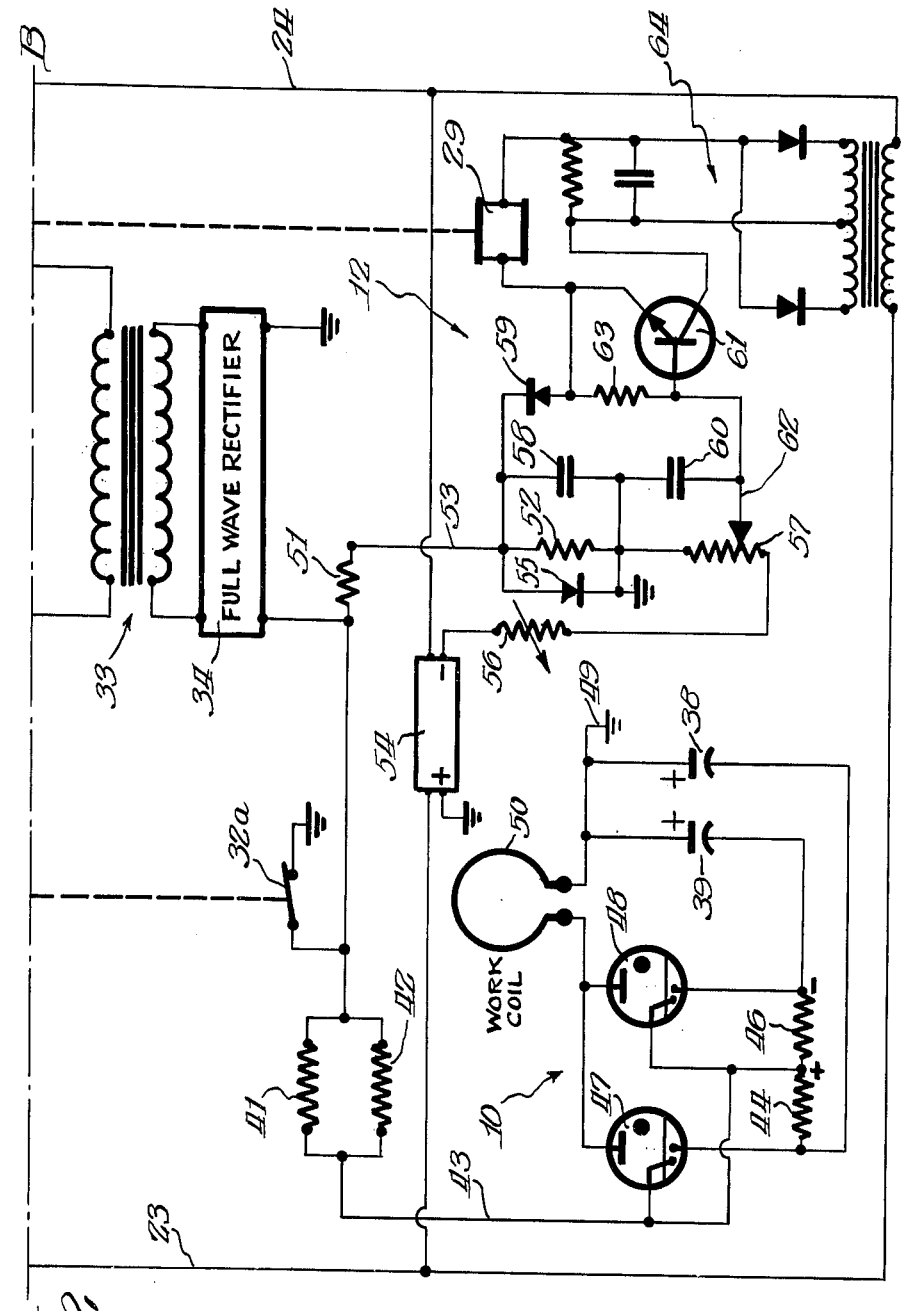

Other objects and advantages of the present invention will become apparent from the following detailed description when considered in conjunction with the accompanying drawings, wherein:

FIGURE 1 is a schematic representation of one portion of the control circuit contemplated by the present invention; and, FIGURE 2 is a schematic diagram which completes the control circuit contemplated by the present invention when joined to the circuitry illustrated in FIGURE 1 along the line A–B.

In general, the control circuit illustrated in FIGURES 1 and 2 includes an energy storage network 10, a relay circuit 11 for effecting and controlling the buildup of energy within the storage network, and a switching circuit 12 for initiating the dissipation of energy stored within the network through a low impedance load. In this way, an extremely high intensity pulse of direct current may be produced which can be utilized to develop an intense magnetic field for use in magnetic forming operations.

To facilitate a complete understanding of the control circuit hereinafter described in detail, a brief description of a typical cycle of operation will be set forth. The control circuit is rendered operable upon the completion of a starting circuit that effects the initiation of a timing cycle as well as a linear buildup of potential that is supplied to the energy storage network 10. The linear buildup of potential is effected by a motor actuated variable transformer circuit that feeds a rectifier circuit. The output from the rectifier circuit is fed to and effects the charging of a capacitor bank included in the storage network 10. This output voltage is also fed to a voltage responsive means that controls the actuation of the switching circuit 12. When the output voltage from the rectifier and filter circuit reaches a preselected level, as determined by variable settings within the switching circuit, the switching circuit 12 will be rendered effective to initiate the discharge of the capacitor bank through a low impedance load. Shortly thereafter the timing cycle previously initiated will terminate the operational cycle and condition the circuit for a subsequent cycle of operation.

Referring in particular to the drawings, a suitable source of alternating current potential (not shown) feeds a pair of main power conductors 13 and 14 that supply operating power to the control circuit. A power-on relay 16 is serially connected between the conductors 13 and 14 to a normally open switch 17 and a normally closed safety switch or interlock 18. The relay 16 is energized upon closure of the switch 17. The interlock 18 is a safety device that functions to cutoff the supply of power to the control circuit upon the occurrence of certain hazardous conditions within a machine including the control circuit. A relatively low voltage is provided for the relay circuit 11 by connecting the power conductors 13 and 14 to the primary of a transformer 15 through a pair of normally open relay contacts 16a and 16b of the power-on relay 16.

In addition to establishing operating potential for the relay circuit 11, the main power conductors 13 and 14 also provide operating potential for the charging circuit 10. In this connection, the conductors are connected through the power-on relay contacts 16a and 16b to a normally open variable tap auto-transformer or Variac circuit 20 which includes the Variac 21 and a normally open relay contact 22a of a starting relay 22. A portion of the Variac winding has a locking relay 19 connected in parallel thereacross that becomes energized when the starting relay contact 22a is closed as a result of the energization of the starting relay 22.

The starting relay 22 has energizing current supplied thereto upon instantaneous closure of a push button starting switch 26 through a pair of conductors 23 and 24 which are connected to the grounded secondary of the transformer 15. The initial path for energizing current to the starting relay includes a normally closed relay contact 27a of a motor control relay 27, a normally closed limit switch contact 28a of a drive motor 28, the starting switch 26, and a normally closed relay contact 29a of a discharge initiating relay 29 that is included in the switching circuit 12.

When energized, the starting relay 22 closes the normally open contact 22a in the Variac circuit 20 thereby impressing the input voltage supplied by the conductors 13 and 14 across the entire Variac 21. Substantially instantaneously, locking relay 19 will be energized. Upon being energized, the locking relay 19 closes relay contacts 19a, 19b, and 19c that are associated therewith.

The relay contact 19a shunts the starting switch 26, the contact 27a and the contact 28a. This serves to complete a locking circuit for the starting relay 22 so that the relay remains in an energized state throughout the charging cycle of the circuit. Relay contact 19b simultaneously completes a path for energizing current from the conductor 23 to the conductor 24 through the motor control relay 27 and a time delay relay 31 that is connected in parallel therewith. Although the motor control relay 27 becomes energized substantially instantaneously, the time delay relay 31 does not become energized until a preselected time interval has elapsed, as hereinafter described.

The closure of the relay contact 19c completes a path for energizing current from the conductor 23 to the conductor 24 through a vacuum switch 32 that controls the actuation of a grounded normally closed switch contact 32a included in the discharge path of the charging circuit 10. A vacuum switch 32 is utilized rather than a conventional relay so that extremely high discharge currents can be handled through the switch contact 32a, as hereinafter described.

The contact 19c that controls the energization and de-energization of the vacuum switch 32 is shunted by a series resistor-capacitor network 30 that serves to reduce the inductive effect of the vacuum switch. The energization of the vacuum switch 32 occurs in conjunction with the energization of the motor control relay 27 and the concomitant closing of the normally open relay contacts 27b and 27d and the opening of the normally closed contact 27c. More particularly, the relay 27, upon being energized, effects the initiation of the operation of the Variac drive motor 28 through the closure of the relay contact 27b and the opening of the relay contact 27c. The path for energizing current to the motor 28, which may be a reversible capacitor start motor, is completed by a limit switch contact 28b which is connected in series with the relay contact 27b. The relay 27 is locked in an energized state by the closure of the relay contact 27d that is connected to the supply conductor 23 through a normally closed relay contact 31a of the time delay relay 31 thereby shunting contact 19b.

The energization of the Variac drive motor 28 and the concomitant opening of the switch contact 32a initiates the buildup of energy within the storage network 10. In this connection, the motor 28a effects the linear buildup of potential across the primary of a transformer 33 through the movement of a motor driven Variac tap 28c across the winding of the Variac 21.

The motor driven tap 28c is connected to one side of the primary of the transformer 33. The other side of the primary is connected to the conductor 13 through the starting relay contact 22a that is connected to the Variac winding. The secondary of the transformer 33 feeds a full wave rectifier 34 that develops a D.-C. potential across the output terminals thereof, the positive terminal of which is grounded.

The grounded contact 32a that is opened by energization of the vacuum switch 32 and the energy storage components of the storage network 10 are connected to the negative output terminal of the rectifier 34. The energy storage components include a pair of parallely connected capacitors 38 and 39 which are charged at a substantially linear rate by the negative output from the full wave rectifier 34 as a result of the traversal of the motor driven tap across the winding of the Variac 21. The charging circuit for the capacitors 38 and 39 includes a pair of parallely connected resistors 41 and 42 and a conductor 43. A series parallel combination including a pair of resistors 44 and 46 and the capacitors 38 and 39 completes the charging circuit.

The resistors 44 and 46 are connected across the ignitor electrode and cathode of each of a pair of ignitrons 47 and 48 which are maintained in a nonconductive state until the capacitors 38 and 39 are to be discharged, as hereinafter described. The plates of the ignitrons 47 and 48 are connected to a ground 49 which is common to the positive plates of the capacitors 38 and 39 through a low impedance load 50. The low impedance load 50 diagrammatically represents a work coil which can be utilized to effect magnetic forming operations.

Also connected to the negative output terminal of the rectifier 34 in parallel with the charging circuit 10 is a pair of resistors 51 and 52 which are serially connected by a conductor 53. The resistor 52 which is shunted by a selenium rectifier 55 that serves as a protecting device, has one side thereof grounded at a point common to the circuit of a regulated power supply 54. The power supply 54, which can be one of several commercially available types, is energized by alternating current potential supplied thereto through the conductors 23 and 24.

A variable resistor 56 and an operating level control resistor 57 are serially connected between the negative output terminal of the regulated power supply 54 and the grounded side of the resistor 52. The variable resistor 56 is utilized to control the magnitude of the voltage dropped across the resistor 57. In turn, the resistor 57 serves to supply bias to a resistor 63 and a control diode 59 in the base-emitter circuit of a switching transistor 61. The voltage drop across the resistor 63, which is connected between the base and the emitter of the transistor 61, maintains the transistor in a non-conductive state during the buildup of voltage across the output terminals of the rectifier and filter circuit 34. The output from another conventional rectifier and filter circuit 64 feeds the collector of the transistor 61 from one output terminal thereof. The other output terminal of the rectifier and filter circuit 64 is connected to the discharge initiating relay 29 which is in turn connected to the emitter of the transistor 61.

Referring in particular to the operation of the switching circuit, an adjustable tap 62 feeds a portion of the potential developed across the resistor 57 to resistor 63 which, in conjunction with the diode 59, constitutes a nulling circuit that controls the conduction of the switching transistor 61. In this connection, a capacitor 58 shunts the resistor 52 and is charged to the level of the potential developed thereacross. Similarly, a capacitor 60 shunts the untapped grounded side of the resistor 57 and is charged to a value corresponding to the voltage drop across that portion of the resistor. The diode 59 will not conduct until the output from the full wave rectifier 34 becomes slightly more negative than the output voltage from the power supply 54.

When this condition is established across the resistor 63 and the diode 59, the diode will be rendered conductive. The resulting passage of current thorugh the resistor 63 thereby effects the initiation of conduction of the switching transistor 61. As a consequence, current will flow through the discharge initiating relay 29 and effect the energization thereof. When the relay 29 is energized, the relay contact 29a is opened thereby interrupting the energizing circuit to the starting relay 22 wherein the contact is serially connected. De-energization of the starting relay 22 returns the relay contact 22a to an open condition thereby removing operating potential from the primary of the transformer 33. Accordingly, the output from the full wave rectifier will be reduced to zero.

In addition, opening of the relay contact 22a causes de-energization of the locking relay 19 and the consequent return of the contacts 19a, 19b and 19c to an open condition. The opening of the contact 19c causes de-energization of the vacuum switch 32 and the closure of contact 32a. The contact 32a provides a discharge path for the capacitors 38 and 39 that can be traced to ground through the resistors 44 and 46, the conductor 43, the parallelly connected resistors 41 and 42, and the contact 32a.

The flow of discharge current through the resistors 44 and 46 and the resulting voltage drop thereacross, makes the cathodes of each of the ignitrons 47 and 48 negative with respect to the ignitor electrodes thereof so that the ignitrons are rendered conductive. When in a conductive state, the ignitrons provide an extremely low impedance discharge path through the work coil 50 to the ground 49. In this connection, the resistors 44 and 46 serve as isolating resistors to insure that substantially equal magnitudes of discharge current will pass through each of the conducting ignitrons to ground. Inasmuch as the impedance of the conducting ignitrons and work coil is substantially less than that of the resistors 41, 42, 44 and 46, substantially all of the current resulting from the discharge of the capacitors 38 and 39 will pass through the work coil 50 thereby resulting in the generation of an extremely high magnetic field which can be utilized to effect magnetic forming operations.

Subsequent to the discharge of the capacitors 38 and 39, sufficient time will have elapsed so that the time delay relay 31, which was conditioned for energization upon the initial closure of the relay contact 19b, will be energized. As a consequence, the contact 31a will be opened in the locking circuit for the relay 27 causing the de-energization thereof. The resulting opening of contact 27b and closing of contact 27c causes the Variac motor to be energized to effect a return of the Variac tap 28c to the initial position so that the control circuitry is conditioned for a subsequent cycle of operation. When the motor driven tap has been returned to the initial position, the motor operated limit switch contact 28d will be opened thereby removing operating potential from the motor.

A subsequent cycle of operation identical to that previously described can be initiated by once again effecting the closure of the starting switch 26. When this occurs, the various circuit components will be energized so that the linear buildup of potential is effected across the output of the full wave rectifier 34. As a consequence, the capacitors 38 and 39 will again be charged to a preselected voltage level as controlled by the settings of the resistors 56 and 57 within the switching circuit 12. Thereafter, the capacitors will be discharged through the low impedance load so that the required magnetic field is produced.

The sequence of operation including the charging and discharging of the capacitors 38 and 39 takes place in less than two seconds which is the period required for the traversal of the Variac winding by the motor driven Variac tap 28c. However, the time delay relay 31 is chosen so that a period of approximately four seconds will elapse prior to the return of the Variac tap to its initial position and the resulting cutoff of the Variac motor 28. This additional time interval allows for the complete discharge of the capacitors 38 and 39 and provides a sufficiently long interval to accommodate controlled variations in the length of the operational cycle.

A control circuit embodying the features of the invention as hereinbefore described can be utilized to produce current pulses having magnitudes approaching approximately 50 kiloamperes. When current pulses of these proportions are discharged through a low impedance inductive load such as the work coil 50, magnetic fields approaching 125 kilogauss can be realized.

It should be understood that various modifications in the structural configuration of the embodiments previously described can be effected by one skilled in the art without deviating from the invention as set forth in the following claims.

What is claimed is:

1. A circuit for controlling the selective charging of a capacitor bank and the selective discharging thereof through a current responsive transducer used in forming operations, which circuit comprises means for providing a direct current voltage, a switch means causing said voltage providing means to apply a voltage to the capacitor bank to effect charging thereof, means varying the voltage applied to the capacitor bank from a low voltage to a high voltage, second switch means electrically coupled to the capacitor bank for providing an initial discharge path for said capacitor bank upon the closure thereof, switch energizing means for maintaining said second switch means in its open position during the charging of said capacitor bank, means responsive to said applied voltage for closing said second switch means when said applied voltage reaches a preselected level and means energized by the initiation of the discharge of the capacitor bank for coupling the transducer to the capacitor bank.

2. A charging circuit, which circuit comprises means for providing a direct current voltage, a capacitor bank, a switch means causing said voltage providing means to apply a voltage to said capacitor bank to effect controlled charging thereof, means varying the voltage applied to said capacitor bank from a low voltage to a high voltage, a coil for use in magnetic forming operations, a second switch means electrically coupled to the capacitor bank for providing an initial discharge path for said capacitor bank upon the closure thereof, switch energizing means for maintaining said second switch means in its open position during the charging of said capacitor bank, means responsive to said applied voltage for closing said second switch means when said applied voltage reaches a preselected level and means energized by the initiation of the discharge of the capacitor bank for coupling said coil to said capacitor bank.

3. A circuit for controlling the selective charging and discharging of a capacitor bank, which circuit comprises a source of direct current voltage, means electrically connecting said source to the capacitor bank, motor actuated means connected to said source for increasing the output voltage thereof to a preselected value so as to effect the charging of the capacitor bank, selectively energizable switch means electrically coupled to the capacitor bank so that an initial discharge path is provided for said capacitor bank upon the energization thereof, voltage responsive switch energizing means for maintaining said switch means in a de-energized state during the increase in the output voltage of said source and the charging of the capacitor bank, means electrically connecting said voltage responsive switch energizing means to said source for rendering said voltage responsive switch energizing means effective to energize said switch means and initiate the discharge of the capacitor bank when the output of said source reaches said preselected value, and means energized by the initiation of the discharge of the capacitor bank for completing a low impedance discharge path for the capacitor bank that shunts the initial discharge path provided therefor.

4. A circuit for controlling the selective charging and discharging of a capacitor bank, which circuit comprises a source of direct current voltage, means electrically connecting said source to the capacitor bank, means connected to said source for effecting the initiation of a timing cycle and for increasing the output voltage of said source to a preselected value so as to effect the charging of the capacitor bank, selectively energizable switch means electrically coupled to the capacitor bank so that an initial discharge path is provided for said capacitor bank upon the energization thereof, voltage responsive switch energizing means for maintaining said switch means in a de-energized state during the increase in the output voltage of said source and the charging of the capacitor bank, means electrically connecting said voltage responsive switch energizing means to said source for rendering said voltage responsive switch energizing means effective to energize said switch means and initiate the discharge of the capacitor bank when the output of said source reaches said preselected value, means energized by the initiation of the discharge of the capacitor bank for completing a low impedance discharge path for the capacitor bank that shunts the initial discharge path provided therefor, and means actuated upon the completion of said timing cycle for conditioning said circuit for a subsequent cycle of operation, the duration of said timing cycle being selected so that the discharge of the capacitor bank is completed prior to the actuation of said conditioning means.

5. A circuit for controlling the selective charging and discharging of a capacitor bank, which circuit comprises a source of direct current voltage, means electrically connecting said source to the capacitor bank, means connected to said source for effecting the initiation of a timing cycle and for increasing the output voltage of said source so as to effect the charging of the capacitor bank, selectively energizable switch means electrically coupled to the capacitor bank so that an initial discharge path is provided for said capacitor bank upon the energization thereof, voltage responsive switch energizing means for maintaining said switch means in a de-energized state during the increase in the output voltage of said source and the charging of the capacitor bank, means connected to said voltage responsive switch energizing means for selectively varying the magnitude of voltage to which said switch energizing means responds, means electrically connecting said voltage responsive switch energizing means to said source of potential for rendering said voltage responsive switch energizing means effective to energize said switch means and initiate the discharge of the capacitor bank when the output of said source reaches the magnitude of voltage to which said voltage responsive switch energizing means responds, means energized by the initiation of the discharge of the capacitor bank for completing a low impedance discharge path for the capacitor bank that shunts the initial discharge path provided therefor, and means actuated upon the completion of said timing cycle for conditioning said circuit for a subsequent cycle of operation, the duration of said timing cycle being selected so that the discharge of the capacitor bank is completed prior to the actuation of said conditioning means.

No references cited.

IRVING L. SRAGOW, *Primary Examiner.*